United States Patent
Surwumwe et al.

(10) Patent No.: US 12,231,583 B2
(45) Date of Patent: Feb. 18, 2025

(54) PRIVACY PROOFING OF SECURE ELEMENT GENERATED CERTIFICATES

(71) Applicant: APPLE INC., Cupertino, CA (US)

(72) Inventors: Adrien Surwumwe, San Jose, CA (US); Robin Burel, Santa Clara, CA (US); Rahul Narayan Singh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 17/658,521

(22) Filed: Apr. 8, 2022

(65) Prior Publication Data
US 2022/0337431 A1    Oct. 20, 2022

Related U.S. Application Data

(60) Provisional application No. 63/176,781, filed on Apr. 19, 2021.

(51) Int. Cl.
*H04L 9/32* (2006.01)
*H04L 9/14* (2006.01)

(52) U.S. Cl.
CPC .............. *H04L 9/3263* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 2016/0241552 A1 | 8/2016 | Lindemann | |
| 2019/0020647 A1* | 1/2019 | Sinha | G06F 21/73 |
| 2020/0021445 A1* | 1/2020 | Caceres | G06F 21/44 |
| 2020/0302043 A1* | 9/2020 | Vachon | G06F 21/36 |

OTHER PUBLICATIONS

Brickell et al., "Direct Anonymous Attestation", Proceedings of The 11th ACM Conference on Computer and Communications Security, Oct. 25-29, 2004, pp. 132-145.
International Search Report and Written Opinion issued in PCT Application No. PCT/US2022/024356, dated Jul. 27, 2022 in 11 pages.

* cited by examiner

*Primary Examiner* — Brandon Hoffman
(74) *Attorney, Agent, or Firm* — Kilpatrick Townsend & Stockton LLP

(57) ABSTRACT

Techniques to privacy proof secure element generated certificates anonymous secure element attestations are described herein. An attestation certificate request can be generated that is signed using the static key of the secure element. The attestation certificate request can then be sent to an attestation server, which can verify the attestation certificate request and return an anonymized attestation certificate. The device containing the secure element can transmit the certificate to third parties to verify attestation data signed by the secure element using the certificate and provide assurance to the third parties that the data being attested to has been generated inside a secure element associated with a specific manufacturer.

20 Claims, 12 Drawing Sheets

PRIVACY PROOFING OF SECURE ELEMENT GENERATED CERTIFICATES

CROSS-REFERENCE

This application claims priority to U.S. Provisional Patent Application No. 63/176,781, filed Apr. 19, 2021, entitled "Privacy Proofing Of Secure Element Generated Certificates," which is herein incorporated by reference in its entirety and for all purposes.

TECHNICAL FIELD

This disclosure relates generally to data processing systems. More specifically, this disclosure relates to a system and associated methods to enable privacy proof certificates generated by a secure element.

BACKGROUND

A secure element is an industry standard tamper resistant chip that is designed to store payment information for use in electronic transactions. A manufacturer of a secure element can generate a unique certificate for the secure element that can be used to attest to the ownership of the secure element. The unique certificate is signed with the root private key of the manufacturer during manufacturing and can be verified using a public key of the manufacturer. The certificate can be signed using a secret key that is stored in the secure element. A third party can verify data signed by the secure element using the certificate and gain assurance that the data has been generated inside the secure element of a specific manufacturer.

SUMMARY

Embodiments described herein provide techniques to privacy proof secure element generated certificates.

One embodiment provides a method comprising creating multiple attestation certificates that enable anonymized attestation of a secure element of an electronic device, where the multiple attestation certificates are cryptographically associated with the secure element. The multiple attestation certificates include a first attestation certificate and a second attestation certificate. The first attestation certificate and the second attestation certificate are different certificates and enable the same electronic device to perform electronic transactions using the secure element without enabling the tracking of the electronic device across transactions. The method additionally includes performing a first electronic data exchange via the secure element in which authenticity of the secure element is attested via the first attestation certificate and performing a second electronic data exchange via the secure element in which authenticity of secure element is attested via the second attestation certificate.

Embodiments also provide a system and non-transitory machine-readable medium that implement the above method.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
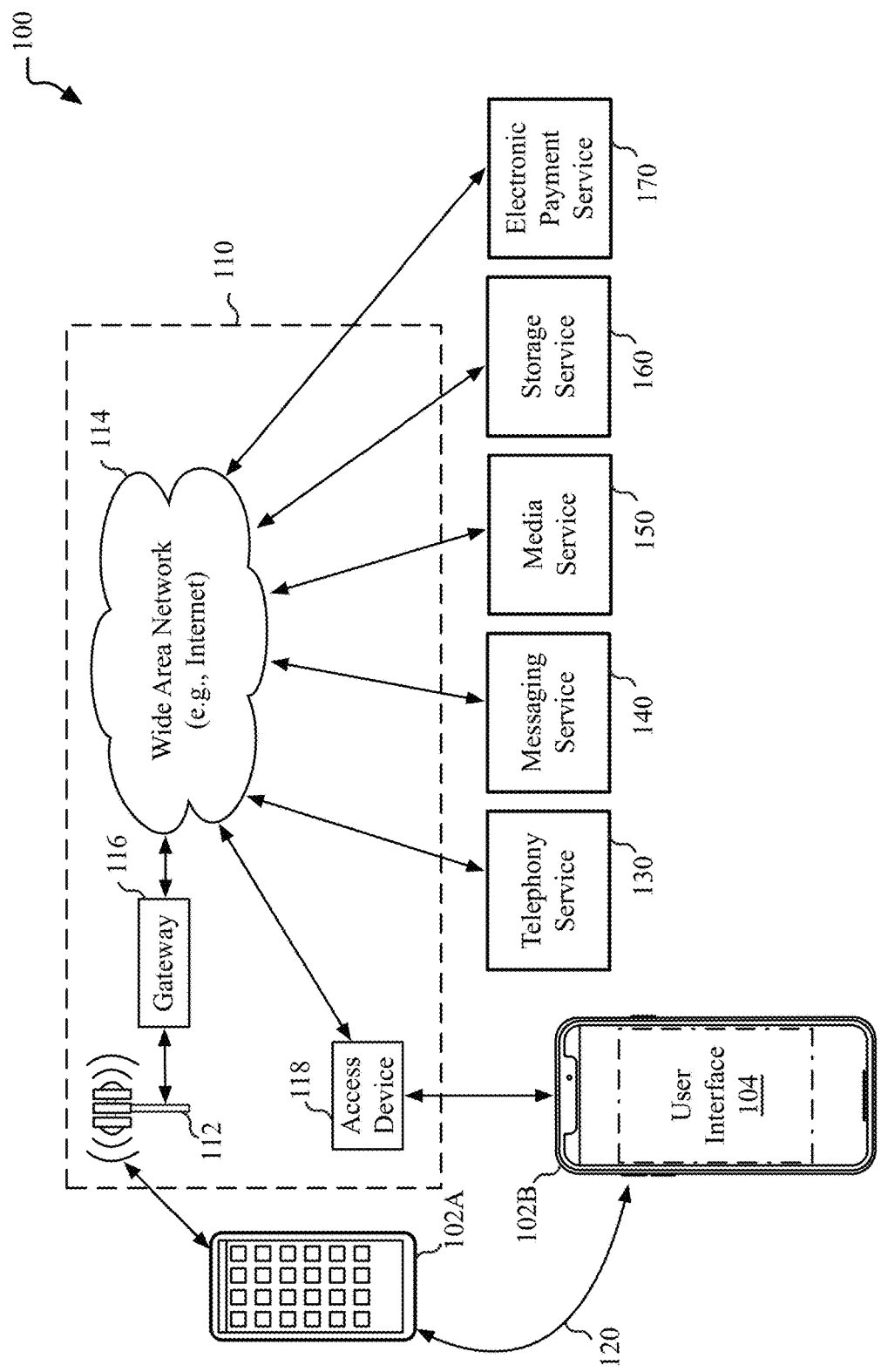
FIG. 1 is a block diagram of an example network operating environment for mobile devices, according to an embodiment.

The downside of using signed certificates to verify the authenticity of data generated by the secure element within a device is that the secure element certificate may contain stable identifiers that allow the third parties to potentially track secure elements and their associated devices. Where the same proof of identity is sent to multiple service providers, those service providers may be able to collude to track the secure element across the multiple services providers.

Embodiments described herein provide techniques to privacy proof secure element generated certificate by enabling the generation of anonymous secure element attestations within the secure element. An attestation certificate request can be generated that is signed using the static key of the secure element. The attestation certificate request can then be sent to an attestation server, which can verify the attestation certificate request and return an anonymized attestation certificate. The device containing the secure element can transmit the certificate to third parties to verify attestation data signed by the secure element using the certificate and provide assurance to the third parties that the data being attested to has been generated inside a secure element associated with a specific manufacturer. In some embodiments, the attestation data can also be used to verify that the secure element is in an uncompromised state. The new certificates can be shared with third parties to enable the secure element attestation without leaking the stable identifier of the secure element. In one embodiment, the certificates described herein are X.509 certificates, which is a standard format for public key certificates. The techniques described herein can apply to other types of certificates. The techniques described herein enable a variety of mechanisms to prevent the long-term tracking of a device based on the stable identifiers of the secure element of the device. For example, a different certificate can be used for each new signature that is generated. A device may also be configured to assign a specific certificate to each unique third party merchant. A device may also assign a global certificate for use on the device for a limited period of time, with the certificate being renewed on a periodic basis.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of data processing systems, user interfaces for such devices, and associated processes for using such devices are described. In some embodiments, the data processing system may comprise a portable communication device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. The techniques described herein are also applicable to desktop computing devices, and are not specifically limited to mobile devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using the POP3 or IMAP protocols), and retrieve electronic documents and/or streams, such as web pages, photographs, and videos, over the wireless network 112, gateway 116, and wide area network 114 (e.g., using TCP/IP or UDP). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with a service provider that provides or enables one or more services. Exemplary services include a telephony service 130, a messaging service 140, a media service 150, a storage service 160, and an electronic payment service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The electronic payment service 170, also referred to as a mobile payment service, can enable a user to initiate, authorize, and confirm an exchange of financial value in return for goods and services via the one or more wired and/or wireless networks 110. Other services can also be provided, including a software update service to update operating system software or client software on the mobile devices. In one embodiment, the messaging service 140, media service 150, storage service 160, and electronic payment service 170 can each be associated with a cloud service provider, where the various services are facilitated via a cloud services account associated with the mobile devices 102A-102B.

Figure 2:
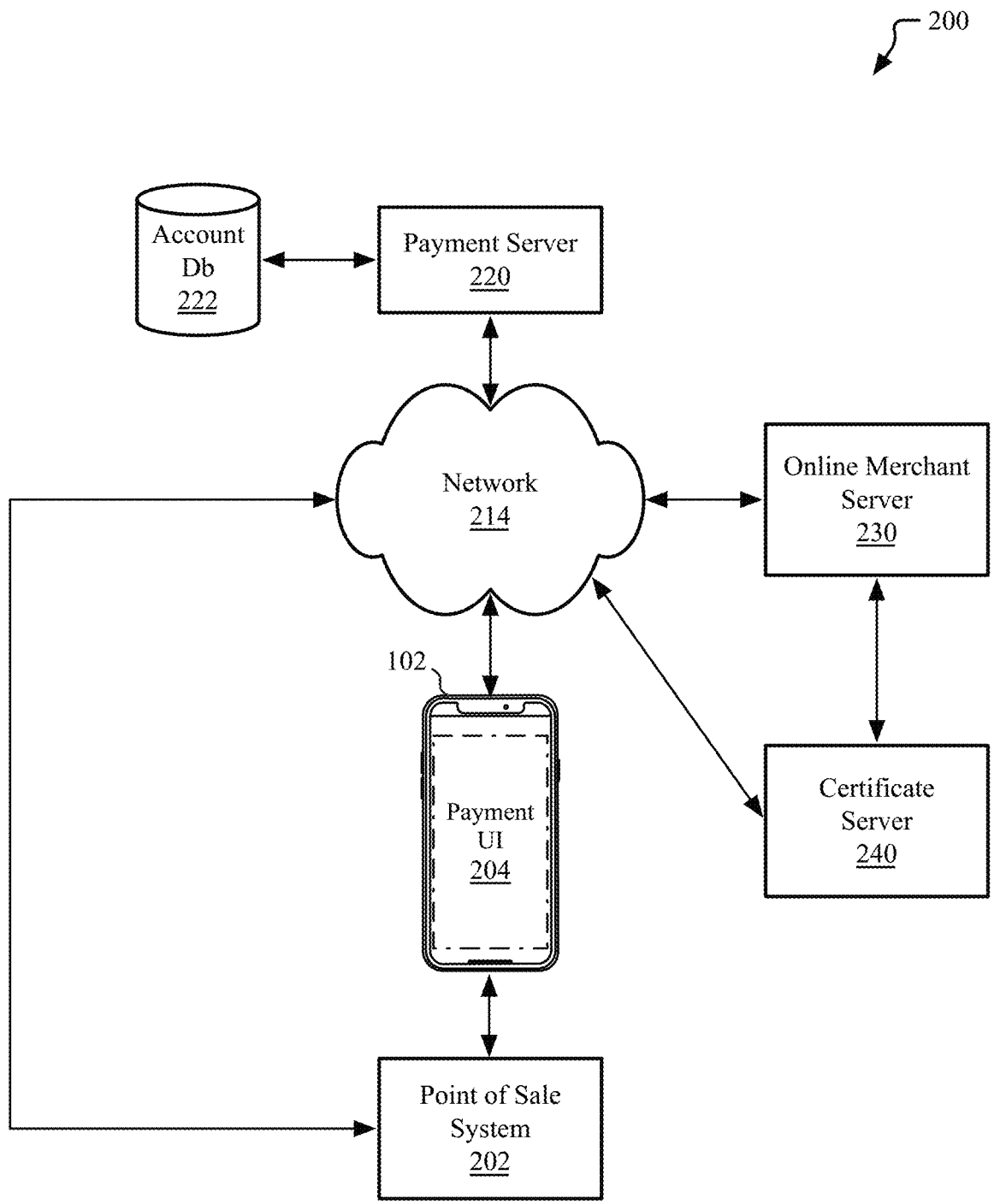
FIG. 2 illustrates an online payment system that may use payment information stored by a secure element.

FIG. 2 illustrates an online payment system 200 that enables transactions with merchants using an electronic device. The online payment system 200 includes a mobile device 102 having a payment user interface 204 and/or a point of sale system 202. The mobile device 102 or point of sale system 202 can communicate over a network 214 with a payment server 220 and/or online merchant server 230. The network 214 may be a network similar to the wide area network 114 of FIG. 1. The mobile device 102 can be either of mobile device 102A and mobile device 102B, as illustrated in FIG. 1. The mobile device 102 can present a payment user interface 204 via a display of the mobile device 102 that facilitates use of the online payment system 200 to pay for goods and/or services. Payment is performed via the online payment system 200 without exposing the specific details of the underlying payment mechanism (e.g., credit card number). A secure element processor on the mobile device 102 can execute applets that are certified by payment networks or card issuers. Credit, debit, or prepaid card data can be sent from a payment network or a card issuer and encrypted for use by the secure element applets using keys that are known only to the payment network or card issuer and the security domain of the applet. The data is stored within the secure element and protected using security features of the secure element.

Transactions can be performed via an application on the mobile device 102 or via a point of sale system 202. When a payment is performed via an application, the mobile device 102 can select the online payment system 200 as a payment mechanism for use with the online merchant server 230 and can select a specific payment mechanism to use via the online payment system 200. The specific dataflow can vary across embodiments. In one embodiment, a cryptogram (e.g., encrypted data message) can be created by the mobile device 102 that includes encrypted information. The encrypted information can be used to identify a payment mechanism associated with a user account on the mobile device 102, where the user account is also associated with the online payment system 200. The encrypted information can also include certificates or other cryptographic material to identify the mobile device 102, secure processors, and secure elements within the mobile device 102.

The mobile device 102 can also pay for goods and/or services at a physical location of a merchant via the point of sale system 202. The precise data flow may vary according to embodiments. In one embodiment, the mobile device 102 can use a short range wireless radio technology, such as near field communication (NFC), to transmit a unique device number and transaction specific dynamic security code to the point of sale system 202. The point of sale system 202 can verify the unique device number and the transaction specific dynamic security code with the payment server 220 and approve payment. The point of sale system 202 may communicate directly with the secure element through the NFC controller over a dedicated hardware bus. The point of sale system 202 and/or online merchant server 230 may request public keys and/or certificates to verify the validity and authenticity of the secure element.

In one embodiment the mobile device 102, online merchant server 230, and payment server 220 may each communicate with a certificate server 240 to retrieve and/or verify certificates used by the mobile device 102 and/or online merchant server 230 to attest to the authenticity of the respective devices or servers. For example, the mobile device 102, and/or secure element within the mobile device 102 can have a public key that can be verified via a certificate that is used via the certificate server 240. The user account on the mobile device 102 may also have a public key that can be verified via a certificate. The online merchant server 230 and/or payment server 220 can also have keys or identities that can be verified via a certificate issued by the certificate server 240.

The payment server 220 can communicate with an account database 222 that stores information on user accounts. The account database 222 can include user account information for a user account associated with the mobile device 102. Each user account can include payment material that the user/account holder of the mobile device can use to pay for goods and/or services via the online payment system 200. The payment server 220 can locate an account based on a payment material provided by the mobile device 102 via the online merchant server 230 or point of sale system 202. The payment transaction can be recorded in association with the appropriate account in the account database 222 without directly exposing the account information in the account database 222 to the online merchant server 230 or the merchant associated with the point of sale system 202. Payment may be denied when the provided payment material is not consistent (e.g., an expiration date does not correspond to a credit, debit or gift card number) or when no account includes payment material matching that from the POS communication.

In one embodiment, application-based payment via the online merchant server 230 and payment via the point of sale system 202 are secured via biometric credentials, such as a fingerprint or facial recognition. The biometric credentials may be gathered by the mobile device 102 and verified before the payment process is initiated by the mobile device. In one embodiment, one or more identifiers, keys, and/or certificates associated with the payment process are securely stored in a secure processor or secure memory. Access to the securely stored identifiers, keys, and/or certificates can be unlocked based on successful biometric authentication, or via a fallback authentication mechanism (e.g., passcode, password, PIN).

Figure 3:
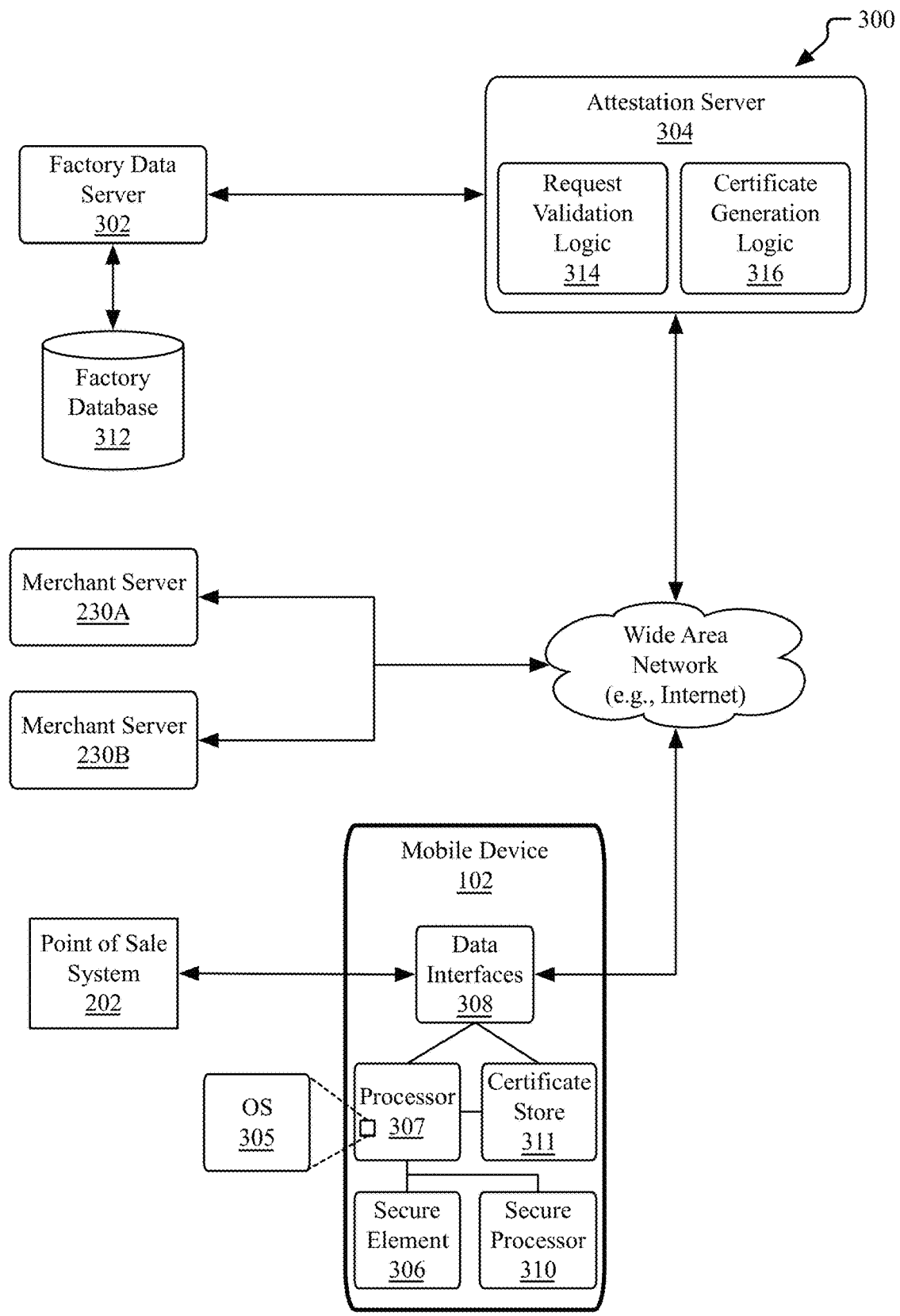
FIG. 3 illustrates a system of privacy proofing certificates generated by a secure element of an electronic device.

FIG. 3 illustrates a system 300 of privacy proofing certificates generated by a secure element of an electronic device. The system 300 includes a mobile device 102 as described herein. The features enabled by the system 300 are also applicable to other forms of electronic devices that include secure elements.

The mobile device 102 described herein can include a secure element 306, a processor 307 and one or more data interfaces 308. The processor 307 can be an application processor and include multiple processor cores. The processor 307 can also include other types of processor cores. The mobile device 102 can also include a secure processor 310 that can perform cryptographic operations and facilitate the secure storage of hardware keys and identification data that is specific to the mobile device 102. The mobile device 102 can also include a certificate store 311 that stores certificates that are accessible to application that execute on the processor 307. The certificate store 311 may be separate from a certificate or key store that may reside within the secure element 306 and/or secure processor 310. For example, the certificate store 311 can store public key certificates, while private keys and associated certificates are secured by the secure element 306 or secure processor 310. An encryption secured channel can be established between the secure element 306 and the secure processor 310 to enable the secure transfer of sensitive data. In one embodiment, the secure processor 310 is also configured to securely store data that is used for biometric authentication, such as via a fingerprint reader or camera used for face detection.

The mobile device 102 includes software and/or firmware logic associated with an operating system (OS) 305 that is executed by the processor 307. The OS 305 can communicate with logic executed by the secure element 306 and secure processor 310 via one or more secure interfaces. The OS 305 can also include management logic to manage connections that are established via the one or more data interfaces 308 and can configure access to the certificate store 311 for applications executed by the processor 307.

The certificate store 311 can store a set of anonymized certificates, which may be X.509 certificates that provide a public key that can be used to attest to data generated by the secure element 306. Instead of sending the same secure element attestation certificate to multiple service providers (e.g., merchant server 230A-230B, point of sale system 202), multiple key pairs and associated certificates can be generated. A separate certificate can be used for each signature, each transaction, or each service provider. A single global certificate may also be used and periodically renewed. A batch of multiple certificates can be requested at once and stored in the certificate store 311 for use over a period of time.

The anonymous certificates can be generated using an attestation server 304. The attestation server 304 includes request validation logic 314 to validate requests for anonymous secure element certificates that are received from the mobile device 102. After receipt of a valid request, certificate generation logic 316 of the attestation server 304 can generate anonymized certificates for the secure element 306 of the mobile device 102. The process of validating a request from the mobile device 102 can include communicating with a factory data server 302 that stores data that is generated during the manufacturing of the mobile device 102. The factory data server 302 includes or couples with a factory database 312 that can be used to verify that the secure element 306 is validly associated with the mobile device 102. For example, the identifier of the secure element 306 is associated with the identifier of the mobile device 102 during manufacturing. The attestation server 304 can request the factory data server 302 to send a manifest for components associated with the mobile device 102. The attestation server 304 can then verify that the secure element 306 has not been extracted from the original device in which it was installed and placed into a different device, as well as verifying that the mobile device 102 includes the secure element 306 that is assigned to the mobile device 102.

Figure 4:
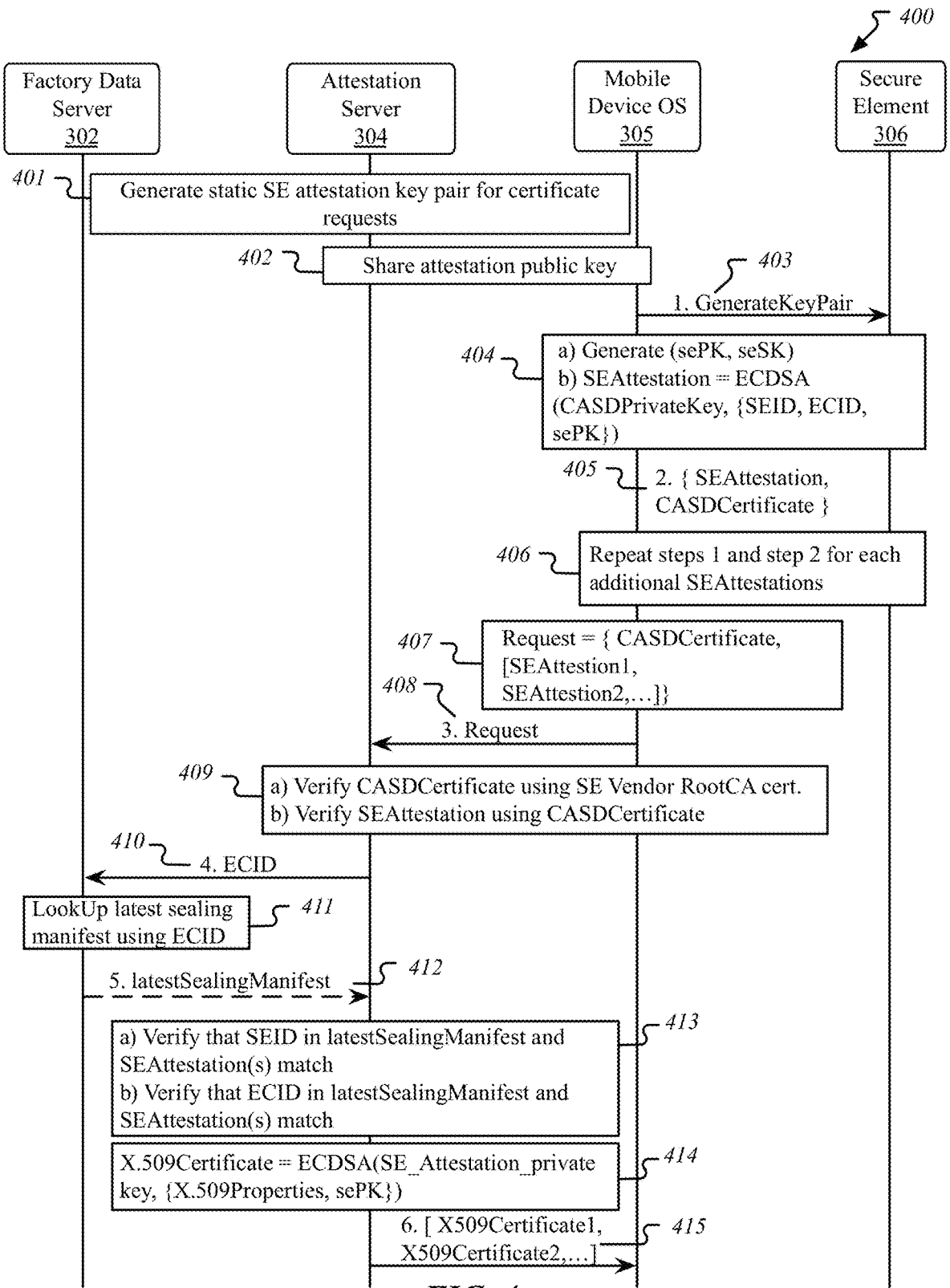
FIG. 4 illustrates a sequence diagram of a process to generate anonymized attestation certificates for a secure element.

FIG. 4 illustrates a sequence diagram of a process 400 to generate anonymized attestation certificates for a secure element. The process 400 is performed between the factory data server 302, attestation server 304, the OS 305 of the mobile device 102, and the secure element 306 of the mobile device 102. The attestation server 304 can perform a preliminary operation (401) to generate a static secure element attestation key pair. The attestation server 304 can then perform an additional preliminary operation (402) to share the attestation public key with the mobile device OS 305. The attestation public key can be used by the mobile device OS 305 to verify the signature of anonymized attestation certificates that are received from the attestation server 304.

In response to a request from an application executed on the mobile device 102, the mobile device OS 305 can perform an operation (403) to generate a key pair. In one embodiment, generating the key pair includes operations (404) to generate a key pair including a secure element public key (sePK) and a secure element secret key (seSK), which respectively are the public and private portions of the keypair. Any number of key pairs can be generated by the secure element 306 in response to a request from an application. An application can request the generation of a secure element key pair to enable the application to perform an operation or action that is mediated or gated by an applet that executes on the secure element, such as performing a payment operation or using an electronic key to access a door or vehicle.

For each keypair, a secure element attestation (SEAttestation) package can be generated. The SE attestation package, in one embodiment includes an SEID, which is a unique identifier for the hardware within the secure element 306, an ECID, which is a unique identifier for the hardware of the electronic device 102, and the secure element public key. In one embodiment, storage of the ECID is managed by the secure processor 310 of FIG. 3 and the ECID is sent to the secure element 306 via the secure channel established via the secure processor 310 and the secure element 306. The SE attestation package can be signed using a digital signature algorithm, such as but not limited to an elliptic curve digital signature algorithm (ECDSA). The signing key for the SE attestation package may be a controlling authority signature domain private key (CASDPrivateKey), which is a long term hardware key that is provisioned to the secure element 306 during manufacturing. The OS 305 can then perform an operation (405) to group the generated SE attestation with a CASDCertificate, which is a certificate (e.g., X.509 certificate) that includes a long term public key (CASDPublicKey) of the secure element. The OS 305 may then perform an additional operation (406), which includes repeating the steps of operation 404 and operation 405 for each additional SE attestation package to be generated.

The mobile device OS 305 can then perform an operation (407) to generate a request package that includes the CASDCertificate and an SE attestation package for each generated key pair for which a certificate is to be generated by the attestation server 304. Each SEAttestion package may also include the CASDCertificate for the secure element 306 or a single instance of the CASDCertificate may be stored in the request. The mobile device OS 305 can then perform an operation (408) to send the request package to the attestation server 304 along with the CASDCertificate for the secure element. After receiving the request from the mobile device OS 305, the attestation server 304 can perform operations (409) to verify the CASDCertificate using the secure element vendor root certificate and then verify the SE attestation using the CASDCertificate. The SE Vendor RootCA certificate is a public key certificate that identifies a root certificate authority (CA) for the CASDCertificate, which will be associated with the vendor of the secure element 306. The root CA cert can be used to verify the legitimacy of the CASDCertificate. Once verified as legitimate, the CASDCertificate can be used to verify the legitimacy of the SE attestation packages.

After the request is verified as legitimate, the attestation server 304 can use the ECID that is received with the request to verify that the secure element 306 of the mobile device 102 is legitimately associated with the mobile device 102. The attestation server 304 can send a message (410) to the factory data server 302 that includes the ECID. The factory data server 302 can then perform a lookup operation (411) using the ECID to retrieve the latest sealing manifest associated with the ECID (e.g., from a factory database 312 as in FIG. 3). The sealing manifest includes the digest of each blob of factory calibration and provisioning data assigned to the device and is signed by the factory data server 302, or another server (e.g., sealing server) that is associated with the factory data server 302. If any components of the mobile device 102 are replaced with other legitimate components, the manifest associated with the ECID of the mobile device 102 can be updated with identifiers of the replaced components and re-sealed. The factory data server 302 can return (412) the sealing manifest to the attestation server 304 after retrieving the latest manifest from the factory database. The attestation server 304, having receipt of the latest sealing manifest, can perform operations (413) to verify that the SEID and ECID in the latest sealing manifest matches the identifiers received in the SE attestation packages.

After verifying the SEID and ECID listed in the SE attestation packages matches the identifiers listed in the sealing manifest, the attestation server 304 can perform an operation (414) generate a new certificate for each SE attestation package within the request. The attestation server 304 can perform an operation (415) to generate a certificate, which may be an X.509 Certificate, for each SE attestation package received in the request from the mobile device OS 305. In one embodiment, each certificate can include a signature that is generated using the private portion of the SE attestation key pair generated during operation 401 based on a set of properties (e.g., X.509Properties) specified for the certificate and the secure element public key for which the certificate is to be generated. In one embodiment, the properties specified for the certificate can indicate the capabilities of the generated certificate and/or the type of operations that can be performed using the certificate. For example, the properties can specify a validity period for the certificate or the number of times in which a certificate may be used. Properties can also specify an authorized use case for the certificate that indicates the context in which the certificate may be used for attestation of the secure element. A device can specify requested properties for a certificate, or properties can be automatically assigned for a certificate.

In one embodiment, the attestation server 304 can be configured with rules that will be applied to certificate generation requests. For example, a single device may be limited in the number of certificates that it can request within a time period. In one embodiment, server rules can be applied to limit the properties that can be granted to or specified for a certificate. For example, a validity period that may be requested for a certificate may be limited (e.g., 24 hours), but may be extended if use of the certificate is limited to circumstances in which biometric authentication is in use. Furthermore, the properties on generated certificates may be limited based on the type of application or services for which the certificate may be used. Certificates for use with a service may also be limited based on the type of device, class of device, or even the specific device that is requesting certificate generation for a server. For example, the attestation server 304 may be configured to enable a specific version of a device to generate a certificate for use with a specific type of service while preventing generation of the certificate for device versions that are older than the specific version of the device for which certificate generation is enabled.

Figure 5A:
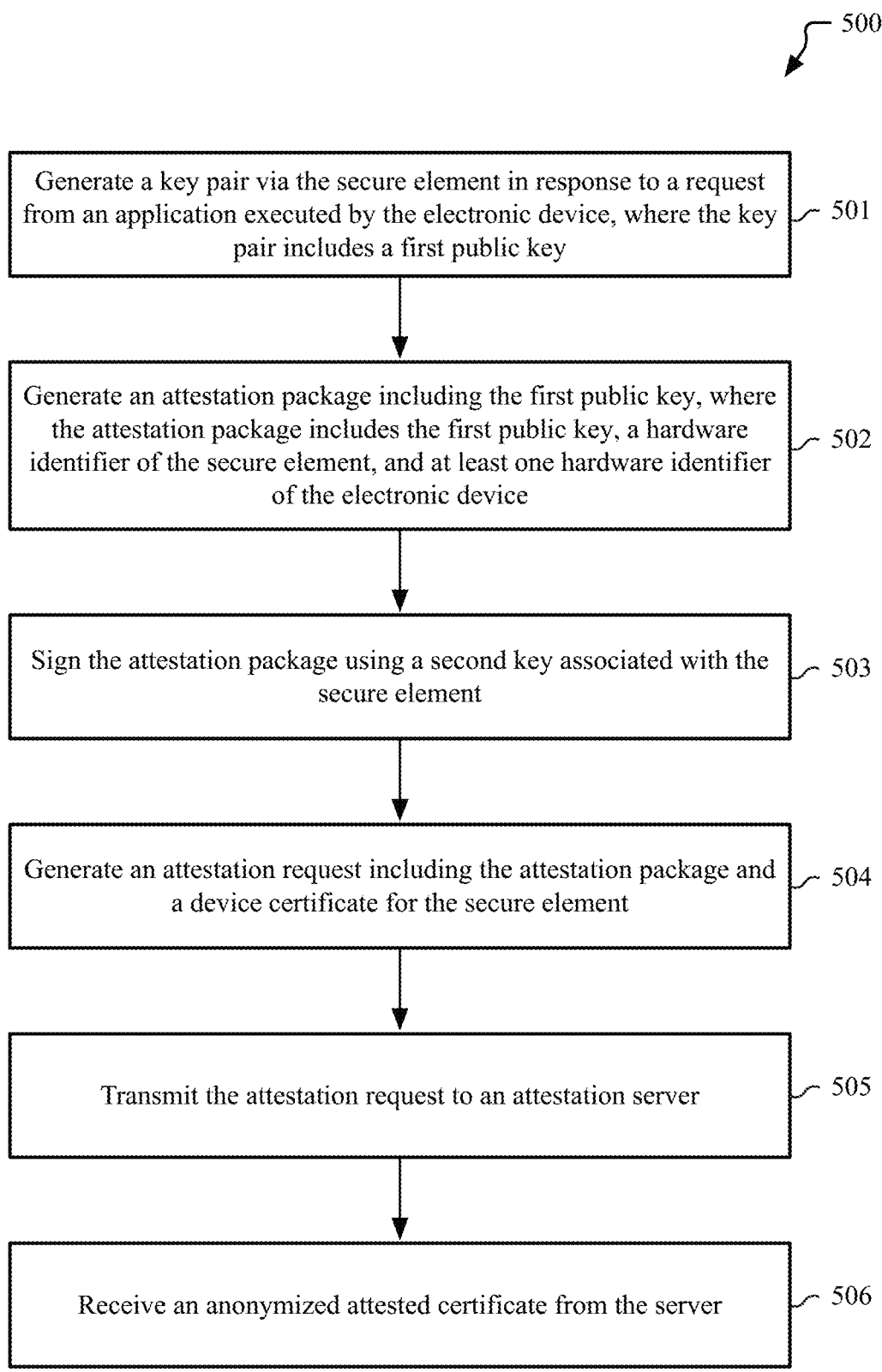
FIG. 5A-5B illustrate methods of generating and using privacy proofed secure element generated certificates.
Figure 5B:
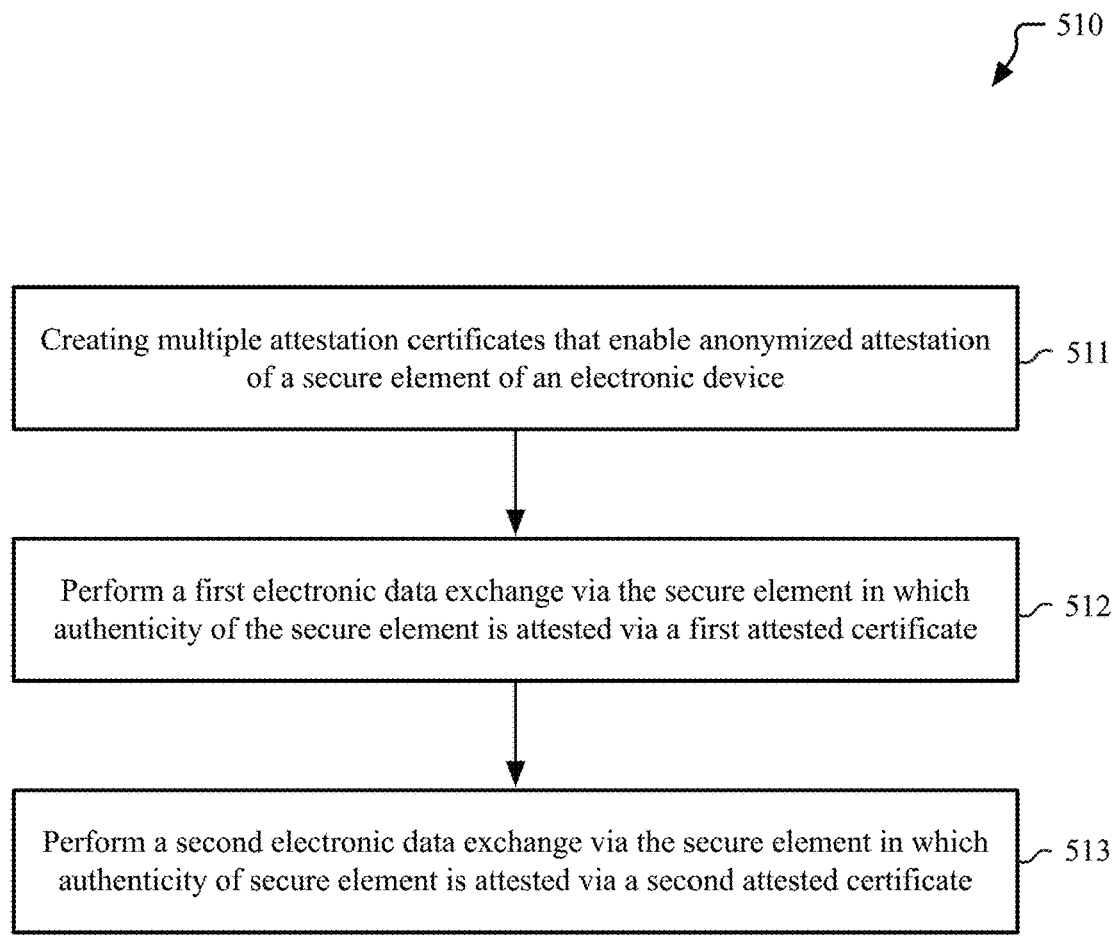

FIG. 5A-5B illustrate methods 500, 510 of generating and using privacy proofed secure element generated certificates. Method 500 can be performed by an electronic device to request the generation of anonymized certificates to attest to the secure element within the device. The anonymized certificates enable attestation while preventing long term tracking of the mobile device via the persistent identifier of the secure element. Method 510 can be performed by the electronic device to perform multiple transactions with a service provider while maintaining privacy via the use of anonymized certificates.

As shown in FIG. 5A, the electronic device can perform a method 500 that includes operations to generate a key pair via the secure element in response to a request from an application executed by the electronic device, where the key pair includes a first public key (501). The electronic device can then generate an attestation package that includes the first public key, a hardware identifier of the secure element, and at least one hardware identifier of the electronic device (502). The electronic device can then sign the attestation package using a second key associated with the secure element (503). The second key associated with the secure element is the long term/persistent private key of the secure element. For example, the second key can be a controlling authority signature domain (CASD) private key. The electronic device can then generate an attestation request that includes the attestation package and a device certificate for the secure element (504). The device certificate for the secure element is the manufacturer supplied certificate for the secure element that includes manufacturer supplied public key. The electronic device can then transmit the attestation request to an attestation server (505). If the request is determined to be valid by the server, the electronic device will receive an anonymized attestation certificate from the server (506). Multiple attestation packages can be generated in a batch and the multiple attestation packages can be transmitted in a single request. The server will then return an anonymized attestation certificate for each attestation package in the request. In one embodiment, the server may return anonymized certificate for any valid packages that are included in the request, if a request includes one more invalid attestation packages. In one embodiment, if any attestation package in the request is invalid, the server may return an error and none of the anonymized certificates will be generated.

As shown in FIG. 5B, the electronic device can perform a method 510 that includes operations to create multiple attestation certificates that enable anonymized attestation of a secure element of an electronic device (511). The multiple attestation certificates may be cryptographically associated with the secure element. For example, a first attestation certificate and a second attestation certificate can be created and the first attestation certificate and the second attestation certificate will be different certificates that include different public keys (e.g., a first public key for the first certificate and a second, different public key for the second certificate). The multiple attestation certificates do not include any persistent identifiers associated with the secure element. Use of the multiple attestation certificates will not enable long-term tracking of the electronic device via persistent identifiers of the secure element. The electronic device is then enabled to perform a first electronic data exchange via the secure element in which authenticity of the secure element is attested via the first attestation certificate (512). The electronic device can then perform a second electronic data exchange via the secure element in which authenticity of secure element is attested via the second attestation certificate (513). Even though the same electronic device performs the first and second electronic data exchanges, should the server providers attempt to collude to track the electronic device, the exchanges will appear as though they were performed by separate devices having separate secure elements.

Figure 6:
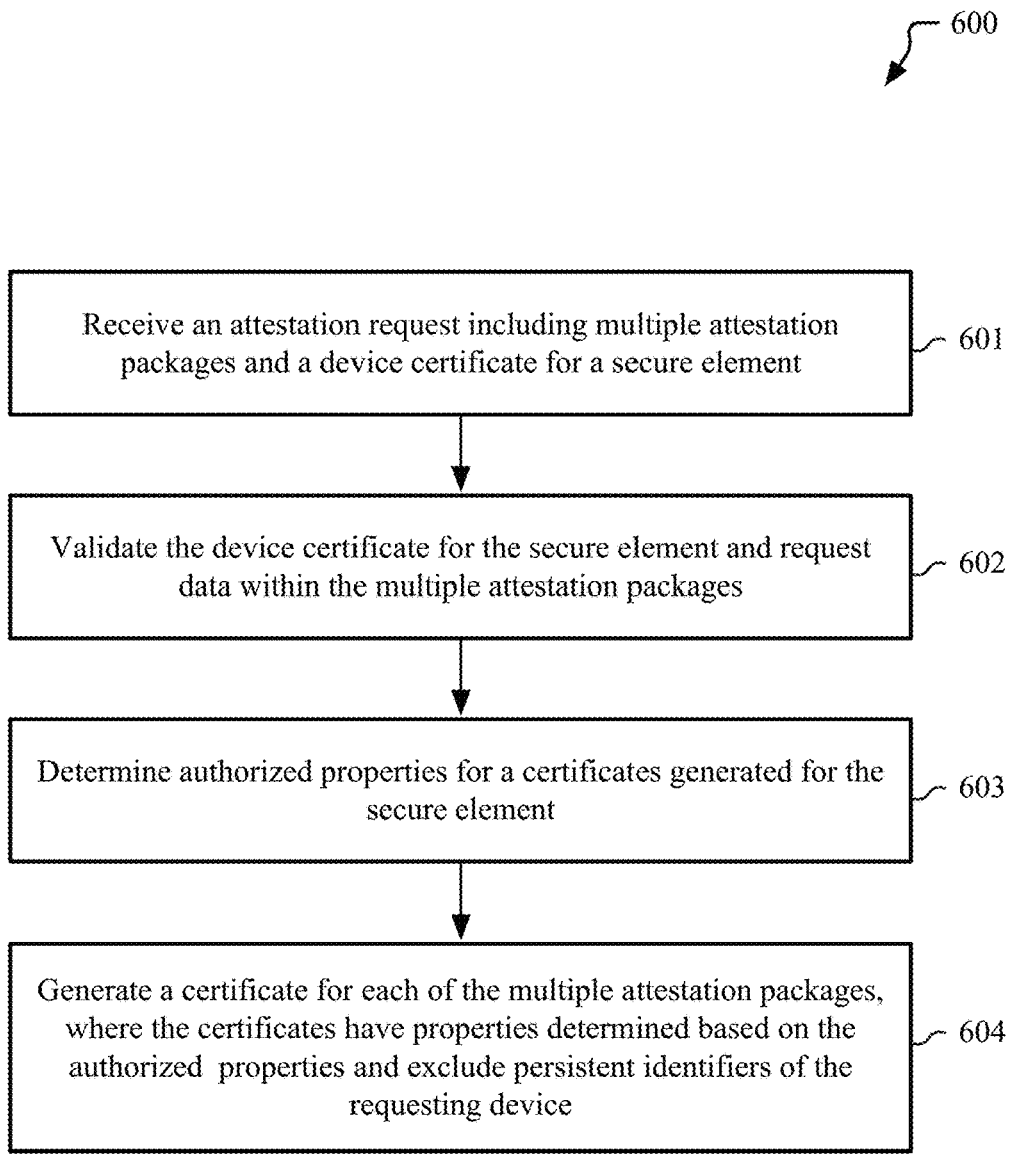
FIG. 6 illustrates a method of generating anonymized attestation certificates for an electronic device.

FIG. 6 illustrates a method 600 of generating anonymized attestation certificates for an electronic device. The method 600 can be performed by a server device, such as a device attestation server described herein. The server device can receive an attestation request including multiple attestation packages and a device certificate for a secure element (601). The server can then validate the device certificate for the secure element and request data within the multiple attestation packages (602). If the request is valid, the server can then determine authorized properties for a certificates generated for the secure element (603). Determining the authorized properties can include determining the degree of authentication (e.g., type of biometric authentication) that should accompany use of the certificate. The server can then generate a certificate for each of the multiple attestation packages, where the certificates have properties determined based on the authorized properties and exclude persistent identifiers of the requesting device (604).

Figure 7:
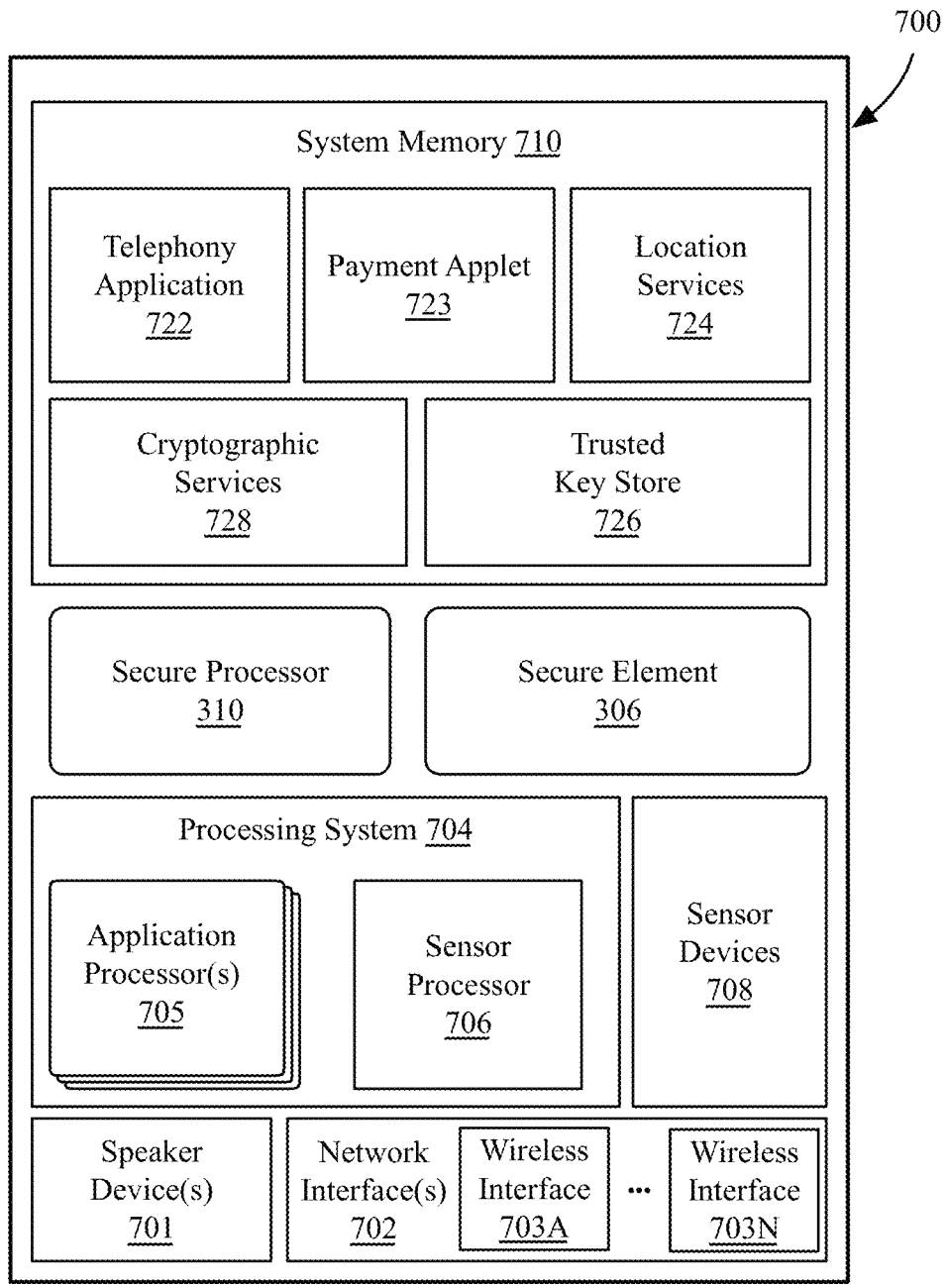
FIG. 7 is a block diagram of a system architecture associated with a mobile device 102, according to an embodiment.

FIG. 7 is a block diagram of a system architecture 700 associated with a mobile device 102, according to an embodiment. The system architecture 700 can include one or more speaker devices 701 to enable playback of the audio portion of media, alarm, alert, notification, or telephone calls played on or performed by the mobile device 102. The system architecture 700 can also include one or more network interfaces 702, which can include one or more wireless interfaces 703A-703N to enable wireless network connectivity. The one or more wireless interfaces 703A-703N can couple with baseband processing logic that enables support for wireless networking protocols such as, but not limited to Bluetooth, Wi-Fi, near field communication (NFC), other wireless networking technologies. In some implementations, the network interface 702 may also support a wired network connection.

The system architecture 700 can also include the secure processor 310 and secure element 306 as also shown in FIG. 3. In various embodiments, the secure processor 310 and secure element 306 may be on the same integrated circuit as the processing system 704 or may be on separate chips and/or packages.

The computing device also includes a processing system 704 having multiple processor devices. In one embodiment the processing system 704 includes one or more application processor(s) 705 to execute instructions for user and system applications that execute on the computing device. The processing system can also include a sensor processor to process and monitor a suite of sensor devices 708 having sensors including, but not limited to motion sensors, light sensors, proximity sensors, biometric sensors, audio sensors (e.g., microphones), and image sensors (e.g., cameras). The sensor processor 706 can enable low-power monitoring of always-on sensors within the suite of sensor devices 708. The sensor processor 706 can allow the application processor(s) 705 to remain in a low power state when the mobile device 102 is not in active use while allowing the mobile device 102 to remain accessible via voice or gesture input to a virtual assistant or to incoming network data received via the network interface 702.

In one embodiment the mobile device 102 includes a system memory 710 which can be a system virtual memory having an address space that includes volatile and non-volatile memory. The system memory 710 can include a telephony application 722, a payment applet 723, and location services logic 724. The telephony application 722 enables the mobile device 102 to contact an emergency service provider. The payment applet 723 can enable the mobile device to make purchases via an online payment system 200 as in FIG. 2. The location services logic 724 enables software logic to query current and historical location data for the mobile device having the system architecture 700. The system memory 710 can also include a cryptographic services library 728 that provides encryption primitives that are accelerated using cryptographic engines within the mobile device. The cryptographic services library can interact with a trusted key store 726, which stores keys and certificates that are generated for use by a mobile device 102 having the system architecture 700, or received from trusted external sources. Certificates received from the certificate server 240 of FIG. 2 and/or attestation server 304 of FIG. 3 may be stored in the trusted key store 726. The payment applet 723 can use primitives provided by the cryptographic services library 728 to perform cryptographic operations described herein.

Figure 8:
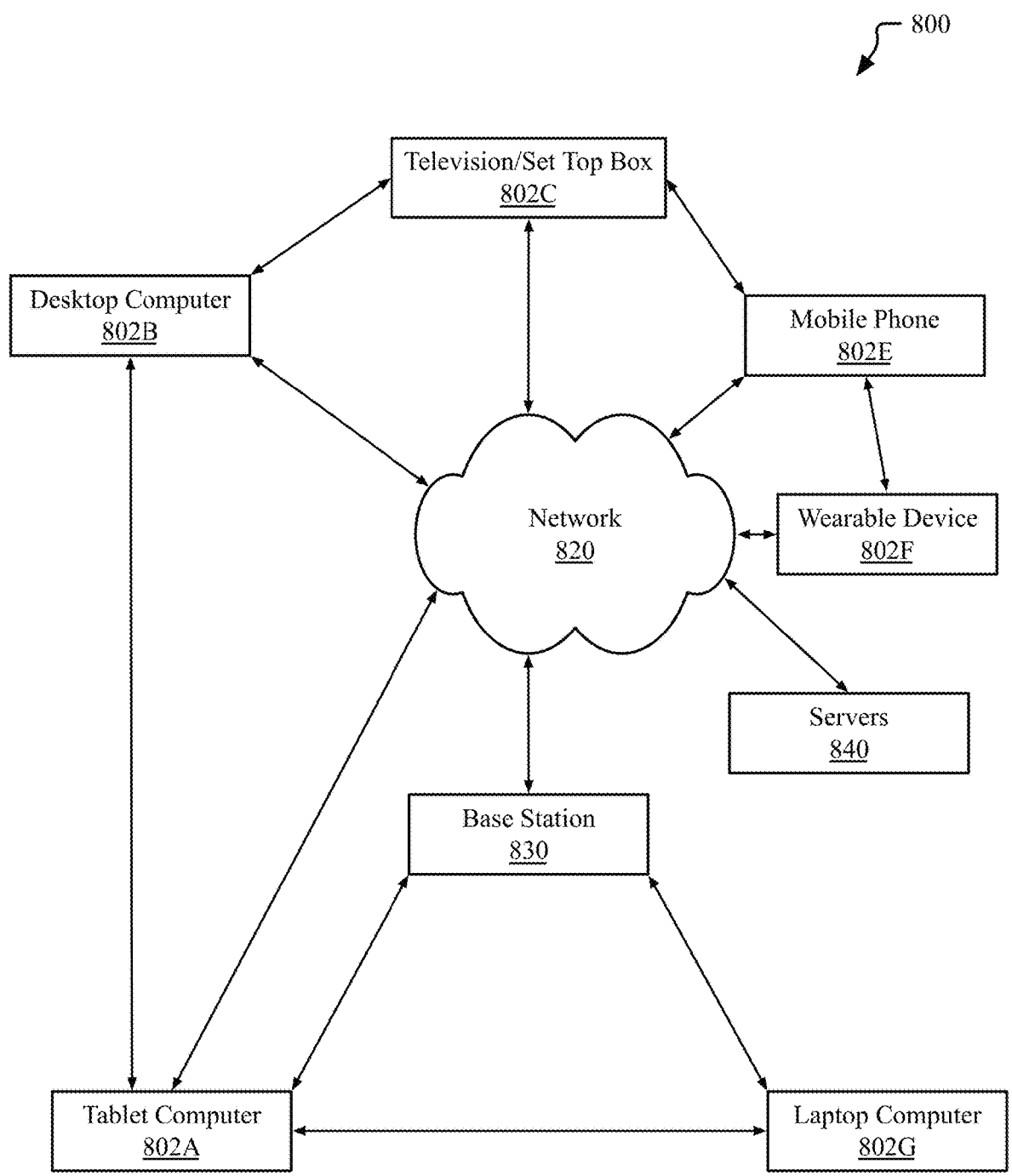
FIG. 8 illustrates an overview of a network environment in which an online payment system may be implemented.

FIG. 8 illustrates an overview of a network environment 800 in which an online payment system may be implemented. The network environment 800 can include one or more electronic devices such as a tablet computer 802A, a desktop computer 802B, a television or set top box 802C, a mobile phone 802E, wearable device 802F, and/or a laptop computer 802G, which may be referred to collectively as electronic devices 802. Electronic devices 802 within range of one another can establish a peer-to-peer communication channel via a direct communication link (e.g., a Bluetooth link, an infrared (IR) link, or the like). Further, the electronic devices 802 can be connected to a network 820, either directly or via a connection to a base station 830. The base station 830 can be, for example, a network access device (e.g., a router, cellular base station, or the like) which provides the electronic devices 802 with network access.

The network environment 800 can also include a set of servers 840 that are accessible to the electronic devices 802 via the network 820. The servers 840 can include online merchant servers, payment servers, and certificate servers as illustrated in FIG. 2. The servers 840 can also include servers to provide authentication and data storage for user accounts associated with the electronic devices 802, including servers that facilitate access to one or more account databases. The servers 840 may be physical servers, virtual servers, or a combination of physical and virtual servers.

The network 820 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 820 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

During operation, any of the electronic devices 802 can use software logic associated with an application or web browser to initial purchase requests with an online merchant server within the set of servers 840. In a retail environment, a mobile phone 802E or wearable device 802F can exchange data over a short range wireless protocol with a point of sale system. The point of sale system may be coupled with the servers 840 via a wireless connection to a base station 830 or via a wired connection to an electronic device 802 such as a desktop computer 802B, tablet computer 802A, or laptop computer 802G. In one embodiment a tablet computer 802A may operate directly as a point of sale system using software logic executed on the tablet computer.

In one embodiment, in addition to a purchase request to an online merchant, payment offers and/or requests may be exchanged between electronic devices 802 associated with different users. In such embodiment the network environment 800 can facilitate direct payment between individuals via the online payment system. For example, an instant messaging system that is used by the electronic devices 802 can be used as a relay mechanism for payment offers and/or requests. Payment offers and/or requests may be secured via the guaranteed encryptor authenticity techniques described herein.

Figure 9:
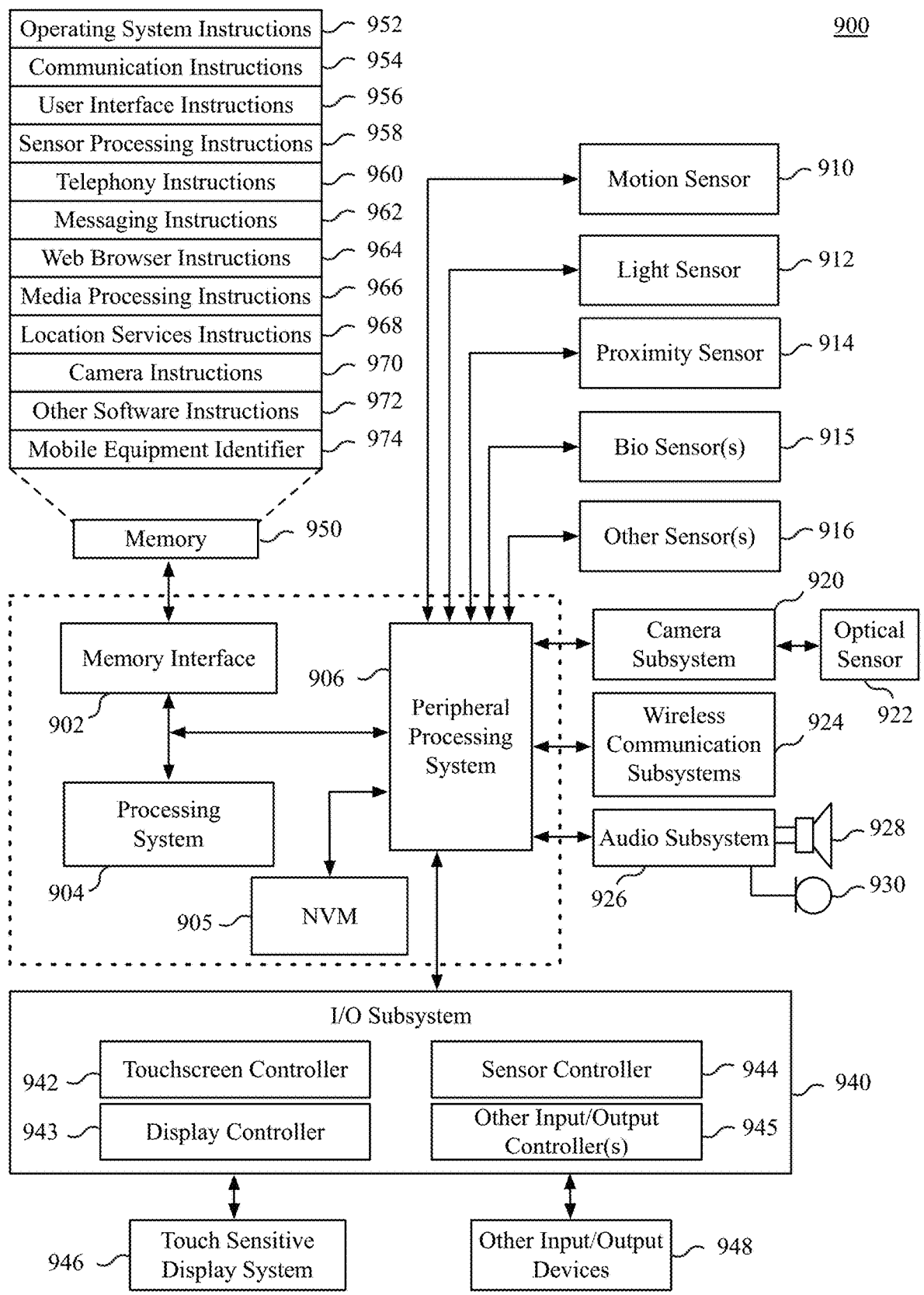
FIG. 9 is a block diagram of a device architecture for a mobile or embedded device, according to an embodiment.

FIG. 9 is a block diagram of a device architecture 900 for a mobile or embedded device, according to an embodiment. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit.

The memory interface 902 can be coupled to memory 950, which can include high-speed random-access memory such as static random-access memory (SRAM) or dynamic random-access memory (DRAM) and/or non-volatile memory 905, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. In particular, the wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In smart media devices described herein, the audio subsystem 926 can be a high-quality audio system including support for virtual surround sound.

The I/O subsystem 940 can include a touch screen controller 942 and/or other input controller(s) 945. For computing devices including a display device, the touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can be a kernel.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
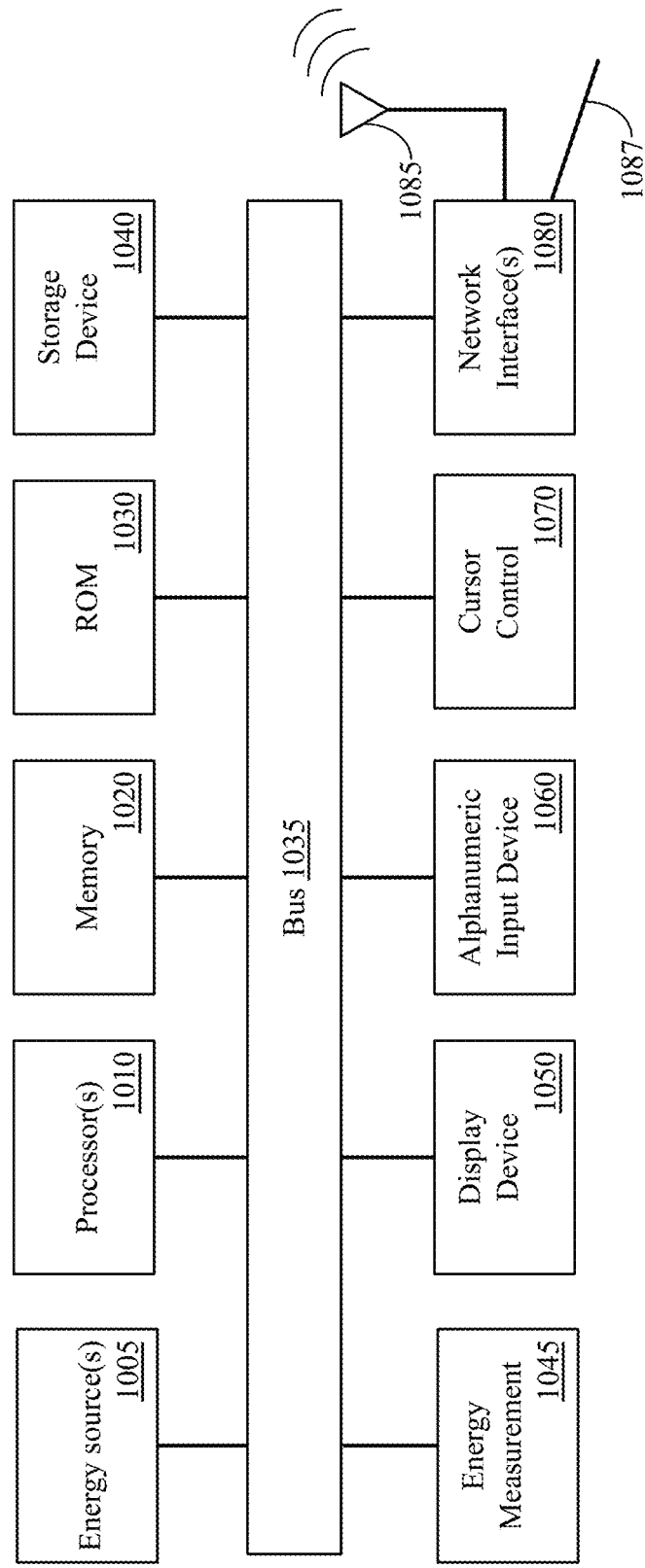
FIG. 10 is a block diagram of a computing system, according to an embodiment.

FIG. 10 is a block diagram of a computing system 1000, according to an embodiment. The illustrated computing system 1000 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer, and/or different components. The computing system 1000 can be used to provide the computing device and/or a server device to which the computing device may connect.

The computing system 1000 includes bus 1035 or other communication device to communicate information, and processor(s) 1010 coupled to bus 1035 that may process information. While the computing system 1000 is illustrated with a single processor, the computing system 1000 may include multiple processors and/or co-processors. The computing system 1000 further may include memory 1020 in the form of random-access memory (RAM) or other dynamic storage device coupled to the bus 1035. The memory 1020 may store information and instructions that may be executed by processor(s) 1010. The memory 1020 may also be main memory that is used to store temporary variables or other intermediate information during execution of instructions by the processor(s) 1010.

The computing system 1000 may also include read only memory (ROM) 1030 and/or another data storage device 1040 coupled to the bus 1035 that may store information and instructions for the processor(s) 1010. The data storage device 1040 can be or include a variety of storage devices, such as a flash memory device, a magnetic disk, or an optical disc and may be coupled to computing system 1000 via the bus 1035 or via a remote peripheral interface.

The computing system 1000 may also be coupled, via the bus 1035, to a display device 1050 to display information to a user. The computing system 1000 can also include an alphanumeric input device 1060, including alphanumeric and other keys, which may be coupled to bus 1035 to communicate information and command selections to processor(s) 1010. Another type of user input device includes a cursor control 1070 device, such as a touchpad, a mouse, a trackball, or cursor direction keys to communicate direction information and command selections to processor(s) 1010 and to control cursor movement on the display device 1050. The computing system 1000 may also receive user input from a remote device that is communicatively coupled via one or more network interface(s) 1080.

The computing system 1000 further may include one or more network interface(s) 1080 to provide access to a network, such as a local area network. The network interface(s) 1080 may include, for example, a wireless network interface having antenna 1085, which may represent one or more antenna(e). The computing system 1000 can include multiple wireless network interfaces such as a combination of Wi-Fi, Bluetooth®, near field communication (NFC), and/or cellular telephony interfaces. The network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, the network interface(s) 1080 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM)

protocols, Code Division, Multiple Access (CDMA) protocols, Long Term Evolution (LTE) protocols, and/or any other type of wireless communications protocol.

The computing system 1000 can further include one or more energy sources 1005 and one or more energy measurement systems 1045. Energy sources 1005 can include an AC/DC adapter coupled to an external power source, one or more batteries, one or more charge storage devices, a USB charger, or other energy source. Energy measurement systems include at least one voltage or amperage measuring device that can measure energy consumed by the computing system 1000 during a predetermined period of time. Additionally, one or more energy measurement systems can be included that measure, e.g., energy consumed by a display device, cooling subsystem, Wi-Fi subsystem, or other frequently used or high-energy consumption subsystem.

Figure 11:
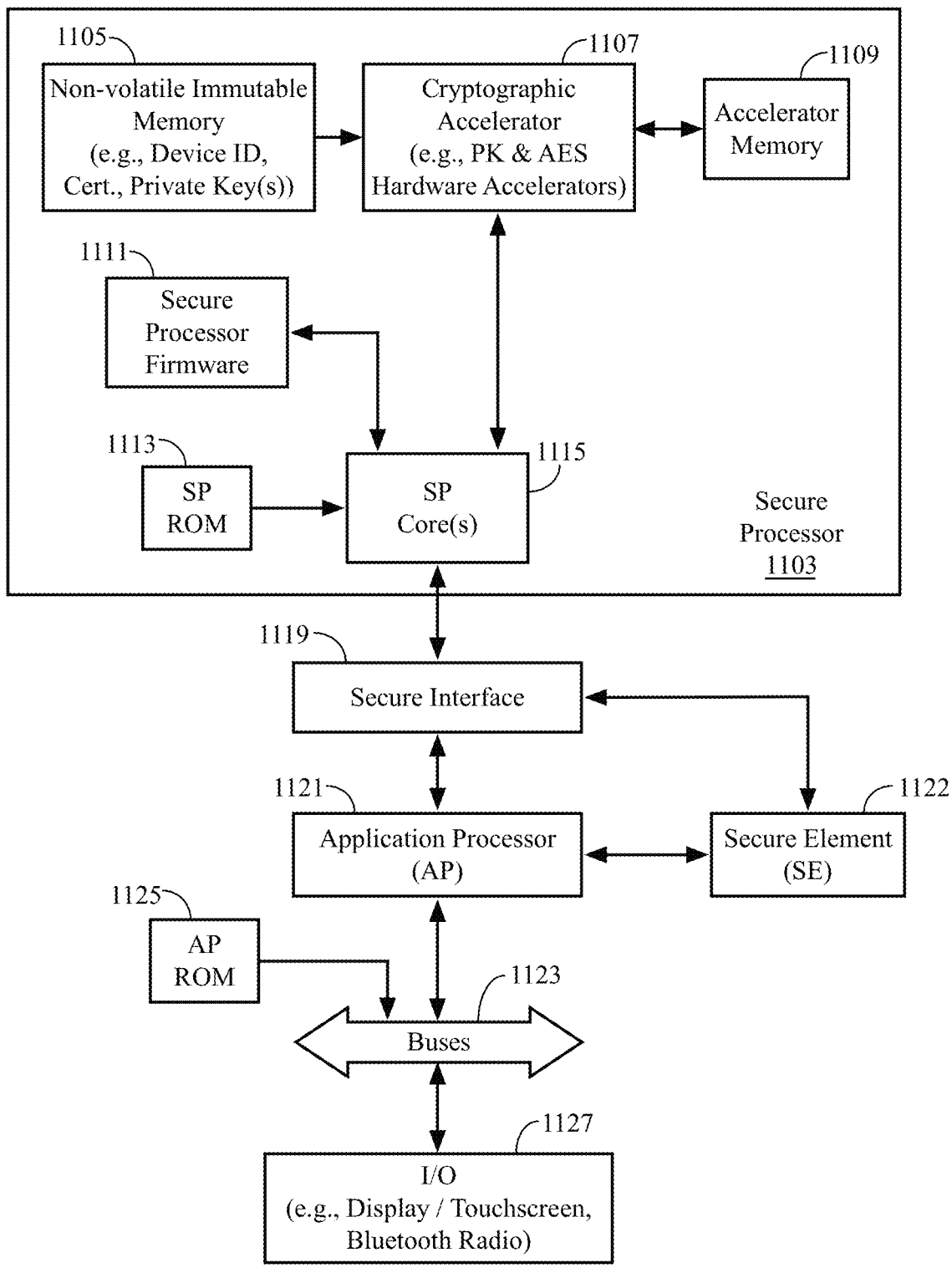
FIG. 11 illustrates a computing system including a secure processor, according to an embodiment.

FIG. 11 illustrates a computing system 1100 including a secure processor, according to an embodiment. In one embodiment the illustrated secure processor 1103 is a secure enclave processor, although other types of secure processors may be used to accelerate cryptographic operations described herein. The computing system 1100 can enable a device to perform secure accelerated cryptographic operations, to provide secure storage for a subset of private keys, and to enable the encryption of other private keys. A version of the computing system 1100 can be included in a primary device (e.g., smartphone) and a secondary device (e.g., computing device, wearable device, wireless accessory) as described herein.

The computing system 1100 includes an application processor 1121 that is communicably coupled with a secure processor 1103 via a secure interface 1119. The computing system 1100 can be a portion of any of the client devices described herein. Additionally, the computing system 1100 can be included into one or more of the servers described herein. In one embodiment, the secure processor 1103 can be implemented as a system on chip. In another embodiment, the application processor 1121 and the secure processor 1103 can be implemented on a system on chip and include one or more processors and memory controllers and other components on a single integrated circuit. The computing system 1100 can also include a secure element 1122 as generally described herein. The secure element 1122 may be configured to communicate with the secure processor 1103 via the secure interface 1119 or via an encrypted communication channel that is relayed through the application processor 1121.

The secure processor 1103 can perform cryptographic operations as described herein, as well as other system security operations such as encrypting user files or verifying code signatures, processing user passcodes, or performing other security operations. The cryptographic operations can be performed in part by the secure processor core 1115 by executing software stored as firmware 1111 in the secure processor 1103. The secure processor core 1115 can also be coupled to a ROM 1113 which can be trusted software that can validate the software in the firmware 1111 before allowing that firmware to execute by checking a code signature of the firmware and verifying that the signature code indicates that the firmware is valid and has not been corrupted before allowing the firmware to be executed by the secure processor core 1115.

The secure processor 1103 can also include a cryptographic accelerator such as cryptographic accelerator 1107 which can perform asymmetric cryptography as well as symmetric cryptography using a hardware accelerator. The cryptographic accelerator 1107 can be coupled to non-volatile and immutable memory 1105 which can store in a secure manner a device identifier or a set of device identifiers and a set of one or more certificates and private keys which are hidden from the rest of the system and are not readable by the rest of the system in one embodiment. The cryptographic accelerator 1107 has access to the private keys and other data within the non-volatile and immutable memory 1105 and access to such memory is not allowed for components outside of the secure processor 1103. In one embodiment, the cryptographic accelerator 1107 can be coupled to an accelerator memory 1109 which can be a scratch pad memory used to perform the cryptographic operations that are performed by the cryptographic accelerator 1107. The application processor 1121 can be coupled to one or more buses 1123 which are coupled to one or more input and output (I/O) devices 1127, such as a touchscreen display a Bluetooth radio, an NFC radio, a Wi-Fi radio, etc. Other input and output devices can be included. The application processor 1121 is also coupled to an application processor ROM 1125, which provides software to boot the application processor. Similarly, the ROM 1113 provides code to boot the secure processor core 1115 within the secure processor 1103.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set, which may be an extension to an instruction set architecture for particular a type of microprocessor. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide techniques to privacy proof secure element generated certificate by enabling the generation of anonymous secure element attestations within the secure element. An attestation certificate request can be generated that is signed using the static key of the secure element. The attestation certificate request can then be sent to an attestation server, which can verify the attestation certificate request and return an anonymized attestation certificate. The device containing the secure element can transmit the certificate to third parties to verify attestation data signed by the secure element using the certificate and provide assurance to the third parties that the data being attested to has been generated inside a secure element associated with a specific manufacturer.

One embodiment provides a method comprising creating multiple attestation certificates that enable anonymized attestation of a secure element of an electronic device, where the multiple attestation certificates each cryptographically associated with the secure element. The multiple attestation certificates include a first attestation certificate and a second attestation certificate. The first attestation certificate and the second attestation certificate are different certificates and enable the same electronic device to perform electronic transactions using the secure element without enabling the tracking of the electronic device across transactions. The method additionally includes performing a first electronic data exchange via the secure element in which authenticity of the secure element is attested via the first attestation certificate and performing a second electronic data exchange via the secure element in which authenticity of secure element is attested via the second attestation certificate.

One embodiment provides a data processing system on an electronic device, the data processing system comprising a secure element, one or more processors including an application processor and a secure circuit, memory to store instructions for execution by the application processor, where the instructions, when executed, cause the one or more processors to create multiple attestation certificates that enable that enable anonymized attestation of a secure element of an electronic device. The multiple attestation certificates are cryptographically associated with the secure element and the multiple attestation certificates include a first attestation certificate and a second attestation certificate. The first attestation certificate and the second attestation certificate are different.

Embodiments also provide a system and non-transitory machine-readable medium that implement the above method.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method comprising:
creating, prior to performing a first electronic data exchange, multiple attestation certificates that enable anonymized attestation of a secure element of an electronic device for each of a plurality of attestation packages of an attestation request, the multiple attestation certificates each cryptographically associated with the secure element,
wherein the multiple attestation certificates include a first attestation certificate and a second attestation certificate,
wherein the first attestation certificate and the second attestation certificate are different, and
wherein the multiple attestation certificates enable anonymized attestation of the secure element prior to performing the first electronic data exchange;
performing the first electronic data exchange via the secure element in which authenticity of the secure element is attested via the first attestation certificate; and
performing a second electronic data exchange via the secure element in which authenticity of secure element is attested via the second attestation certificate.

2. The method as in claim 1, wherein the first attestation certificate includes a first set of properties and the second attestation certificate includes a second set of properties.

3. The method as in claim 2, wherein each set of properties include a validity period and an authorized use case; and
wherein the authorized use case indicates an authentication type to be performed to enable use of an associated certificate.

4. The method as in claim 3, wherein the validity period is determined in part based on a biometric authentication capability of the electronic device.

5. The method as in claim 1, further comprising:
generating a first key pair via the secure element in response to a first request from a first application executed by the electronic device;
generating a first attestation package including a public key of the first key pair, a hardware identifier of the secure element, and at least one hardware identifier of the electronic device;
signing the first attestation package using a second key associated with the secure element;
generating an attestation request including at least the first attestation package and a device certificate for the secure element;
transmitting the attestation request to a server; and
receiving the first attestation certificate from the server for the first attestation package, the first attestation certificate including the public key of the first key pair.

6. The method as in claim 5, wherein the second key is a persistent private key of the secure element, and
wherein the second key is a controlling authority signature domain private key.

7. The method as in claim 5, further comprising:
generating a second key pair via the secure element in response to a second request from a second application executed by the electronic device;
generating a second attestation package including a public key of the second key pair, the hardware identifier of the secure element, and the at least one hardware identifier of the electronic device;
signing the second attestation package using the second key, wherein the attestation request includes the second attestation package; and
receiving the second attestation certificate from the server for the second attestation package, the second attestation certificate including the public key of the second key pair.

8. The method as in claim 5, wherein validity for an attestation package is determined in part based on a number of attestation certificates requested and biometric authentication capability of the electronic device.

9. The method according to claim 1, wherein the anonymized attestation of the secure element is performed by an attestation server.

10. The method according to claim 1, wherein each of the multiple attestation certificates comprise a static secure element attestation key pair.

11. The method according to claim 1, wherein the first attestation certificate includes a first public key, and the second attestation certificate includes a second public key that is different from the first public key.

12. The method according to claim 1, wherein the first electronic data exchange comprises a data exchange for a payment transaction.

13. A data processing system comprising:
a secure element of an electronic device;
one or more processors including an application processor and a secure circuit; and
memory to store instructions for execution by the application processor, wherein the instructions, when executed, cause the one or more processors to:
create, prior to performing a first electronic data exchange, multiple attestation certificates that enable anonymized attestation of the secure element for each of a plurality of attestation packages of an attestation request, the multiple attestation certificates each cryptographically associated with the secure element,
wherein the multiple attestation certificates include a first attestation certificate and a second attestation certificate,
wherein the first attestation certificate and the second attestation certificate are different, and
wherein the multiple attestation certificates enable anonymized attestation of the secure element prior to performing the first electronic data exchange;
perform the first electronic data exchange via the secure element in which authenticity of the secure element is attested via the first attestation certificate; and
perform a second electronic data exchange via the secure element in which authenticity of secure element is attested via the second attestation certificate.

14. The data processing system as in claim 13, wherein the first attestation certificate includes a first set of properties, the second attestation certificate includes a second set of properties, and each set of properties include a validity period and an authorized use case.

15. The data processing system as in claim 14, wherein the authorized use case indicates an authentication type to be performed to enable use of an associated certificate and the validity period is determined in part based on a biometric authentication capability of the electronic device.

16. The data processing system as in claim 13, wherein the one or more processors are further to:
generate a first key pair via the secure element in response to a request from a first application executed by the electronic device;
generate a first attestation package including a public key of the first key pair, a hardware identifier of the secure element, and at least one hardware identifier of the electronic device;
generate a second key pair via the secure element in response to a second request from a second application executed by the electronic device;
generate a second attestation package including a public key of the second key pair, the hardware identifier of the secure element, and the at least one hardware identifier of the electronic device;
sign the first attestation package and the second attestation package using a second key associated with the secure element;
generate an attestation request including the first attestation package, the second attestation package, and a device certificate for the secure element;
transmit the attestation request to a server;
receive the first attestation certificate from the server for the first attestation package, the first attestation certificate including the public key of the first key pair; and
receive the second attestation certificate from the server for the second attestation package, the second attestation certificate including the public key of the second key pair.

17. A non-transitory machine-readable medium storing instructions which, when executed by one or more processors of an electronic device, cause the one or more processors to perform operations comprising:
creating, prior to performing a first electronic data exchange, multiple attestation certificates that enable anonymized attestation of a secure element of the electronic device for each of a plurality of attestation packages of an attestation request, the multiple attestation certificates each cryptographically associated with the secure element,
wherein the multiple attestation certificates include a first attestation certificate and a second attestation certificate,
wherein the first attestation certificate and the second attestation certificate are different, and
wherein the multiple attestation certificates enable anonymized attestation of the secure element prior to performing the first electronic data exchange;
performing the first electronic data exchange via the secure element in which authenticity of the secure element is attested via the first attestation certificate; and
performing a second electronic data exchange via the secure element in which authenticity of secure element is attested via the second attestation certificate.

18. The non-transitory machine-readable medium as in claim 17, wherein the first attestation certificate includes a first set of properties and the second attestation certificate includes a second set of properties, wherein each set of properties include a validity period and an authorized use case.

19. The non-transitory machine-readable medium as in claim 18, wherein the authorized use case indicates an authentication type to be performed to enable use of an associated certificate and the validity period is determined in part based on a biometric authentication capability of the electronic device.

20. The non-transitory machine-readable medium as in claim 19, the operations further comprising:
generating a first key pair via the secure element in response to a request from a first application executed by the electronic device;
generating a first attestation package including a public key of the first key pair, a hardware identifier of the secure element, and at least one hardware identifier of the electronic device;
generating a second key pair via the secure element in response to a second request from a second application executed by the electronic device;
generating a second attestation package including a public key of the second key pair, the hardware identifier of the secure element, and the at least one hardware identifier of the electronic device;

signing the first attestation package and the second attestation package using a second key associated with the secure element;
generating an attestation request including the first attestation package, the second attestation package, and a device certificate for the secure element;
transmitting the attestation request to a server;
receiving the first attestation certificate from the server for the first attestation package, the first attestation certificate including the public key of the first key pair; and
receiving the second attestation certificate from the server for the second attestation package, the second attestation certificate including the public key of the second key pair.

* * * * *